United States Patent
Kubo

(10) Patent No.: US 12,334,508 B2
(45) Date of Patent: Jun. 17, 2025

(54) ELECTRODE APPLIED TO SOLID-STATE BATTERY AND SOLID-STATE BATTERY

(71) Applicant: CANON KABUSHIKI KAISHA, Tokyo (JP)

(72) Inventor: Kenta Kubo, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 560 days.

(21) Appl. No.: 17/680,082

(22) Filed: Feb. 24, 2022

(65) Prior Publication Data

US 2022/0181706 A1   Jun. 9, 2022

Related U.S. Application Data

(63) Continuation of application No. PCT/JP2020/031985, filed on Aug. 25, 2020.

(30) Foreign Application Priority Data

Aug. 30, 2019   (JP) .................................. 2019-158974
Aug. 30, 2019   (JP) .................................. 2019-158975

(51) Int. Cl.
*H01M 10/00*   (2006.01)
*H01M 4/525*   (2010.01)
(Continued)

(52) U.S. Cl.
CPC ....... *H01M 10/0585* (2013.01); *H01M 4/525* (2013.01); *H01M 4/625* (2013.01);
(Continued)

(58) Field of Classification Search
CPC ......... H01M 10/0585; H01M 10/0562; H01M 2004/028; H01M 4/525; H01M 4/625
See application file for complete search history.

(56) References Cited

U.S. PATENT DOCUMENTS

| 2006/0251965 | A1  | 11/2006 | Nagayama |
| 2014/0304862 | A1  | 10/2014 | Matsubara |
| 2017/0317338 | A1* | 11/2017 | Woehrle ................ H01M 4/139 |

FOREIGN PATENT DOCUMENTS

| CN | 1830102 A   | 9/2006 |
| CN | 102356485 A | 2/2012 |

(Continued)

OTHER PUBLICATIONS

Nishino et al., All-Solid State Battery, May 2012, See the Abstract. (Year: 2012).*

(Continued)

*Primary Examiner* — Niki Bakhtiari
*Assistant Examiner* — Monique M Wills
(74) *Attorney, Agent, or Firm* — Canon U.S.A., Inc. I.P. Division

(57) ABSTRACT

An electrode which is to be applied to a solid-state battery and including a collector layer and an active material layer disposed on the collector layer and including an active material showing a concentration distribution in a layer thickness direction which is, among the directions parallel to the layer thickness, a direction toward the side in contact with the collector layer, wherein the active material layer contains at least any one of a conductive auxiliary agent showing a decreasing concentration gradient in the layer thickness direction and a solid electrolyte showing an increasing concentration gradient in the layer thickness direction.

22 Claims, 8 Drawing Sheets

(51) Int. Cl.
  *H01M 4/62* (2006.01)
  *H01M 10/0562* (2010.01)
  *H01M 10/0585* (2010.01)
  *H01M 4/02* (2006.01)

(52) U.S. Cl.
  CPC .................. *H01M 10/0562* (2013.01); *H01M 2004/021* (2013.01); *H01M 2004/028* (2013.01); *H01M 2300/0071* (2013.01)

(56) References Cited

FOREIGN PATENT DOCUMENTS

| CN | 106159312 | A |   | 11/2016 |          |
|----|-----------|---|---|---------|----------|
| CN | 106486678 | A | * | 3/2017  | H01M 12/06 |
| CN | 108390066 | A |   | 8/2018  |          |
| CN | 109301308 | A |   | 2/2019  |          |
| JP | H07192763 | A |   | 7/1995  |          |
| JP | 2005050756 | A | * | 2/2005 | H01M 10/0525 |
| JP | 2009146657 | A |   | 7/2009  |          |
| JP | 2012104270 | A | * | 5/2012 | H01M 10/0525 |
| JP | 5333184   | B2 |  | 11/2013 |          |
| JP | 2014-203665 | A |  | 10/2014 |          |
| JP | 2019029339 | A |   | 2/2019  |          |

OTHER PUBLICATIONS

Choi et al., Composite Cathode, Cathode-membrane Assembly, Comprising An Electrochemical Cell Cathode-membrane Assembly, And A Method For Preparing Cathode-membrane Assembly, Mar. 2017, See the Abstract. (Year: 2017).*

Nagayama et al., Gel Electrolyte Battery, Feb. 2005, See the Abstract. (Year: 2005).*

* cited by examiner

ELECTRODE APPLIED TO SOLID-STATE BATTERY AND SOLID-STATE BATTERY

CROSS-REFERENCE TO RELATED APPLICATIONS

This application is a Continuation of International Patent Application No. PCT/JP2020/031985, filed Aug. 25, 2020, which claims the benefit of Japanese Patent Application Nos. 2019-158975, filed Aug. 30, 2019, and 2019-158974, filed Aug. 30, 2019, all of which are hereby incorporated by reference herein in their entirety.

TECHNICAL FIELD

The present invention relates to a solid-state battery including a solid electrolyte. The present invention particularly relates to an electrode structure applied to a positive electrode or a negative electrode of the solid-state battery.

BACKGROUND ART

A lithium secondary battery is a secondary battery composed of a lithium transition metal oxide such as lithium cobalt oxide serving as a positive electrode material, a graphite-based carbon material serving as a negative electrode material, and an organic electrolytic solution and operates as a battery by lithium ions transferring from the positive electrode to the negative electrode during charging and from the negative electrode to the positive electrode during discharging. The lithium secondary battery can output considerably larger quantity of electricity per volume or weight of the battery (energy density) than other secondary batteries and, therefore, is widely used as a battery of mobile equipment. On the other hand, since an organic electrolytic solution or a gel polymer is used, there are problems of liquid leakage in accordance with the fluidity or the softening property and of the safety caused by combustibility, and use of a solid electrolyte is required.

Regarding solid electrolyte materials, inorganic solid electrolyte materials are incombustible and have a feature of high safety, and realization of an all-solid-state lithium secondary battery (hereafter referred to as an all-solid-state battery in the present specification) has been developed.

It is known that the lithium ion conductivity is increased by mixing a material for a solid electrolyte and a material for an electrode active material so as to increase the specific surface area with respect to a microscopic interface between the solid electrolyte and the electrode active material. Japanese Patent Laid-Open No. 2009-146657 discloses a lithium secondary battery including a solid electrolyte, in which a positive electrode, a solid electrolyte layer, and a negative electrode collector are disposed by being successively stacked, where the positive electrode includes a positive electrode mix layer containing a positive electrode active material powder and a solid electrolyte powder on both surfaces of a flat-plate-like positive electrode collector.

In addition, it is known that regarding an electrode active material containing lithium, injection and release of lithium ions occur in accordance with charge and discharge, and, in such an instance, expansion and contraction of the volume of the electrode active material layer occur, and cracking occurs in the electrode layer containing the electrode active material, thereby causing inhibition of ionic conduction. Regarding a known measure against warping or deterioration in performance of a battery in accordance with such charge and discharge, a predetermined gradient is provided in the layer thickness direction of an electrode active material layer. Japanese Patent Laid-Open No. 2012-104270 discloses an all-solid-state battery including a complex active material layer having a first gradient in which the concentration and the porosity of an electrode active material are increased from the solid electrolyte layer side toward the collector layer side. The all-solid-state battery described in Japanese Patent Laid-Open No. 2012-104270 includes a complex active material layer having a second gradient in which the concentration of a solid electrolyte is decreased from the solid electrolyte layer side toward the collector layer side so as to compensate the first gradient.

CITATION LIST

Patent Literature

PTL 1 Japanese Patent Laid-Open No. 2009-146657
PTL 2 Japanese Patent Laid-Open No. 2012-104270

Regarding the electrodes applied to the solid-state batteries described in Japanese Patent Laid-Open No. 2009-146657 and Japanese Patent Laid-Open No. 2012-104270, giving and receiving of lithium ions (positive electrode active material) are concentrated on the collector layer side in the interface between the positive electrode active material and the solid electrolyte in the active material layer since carrier transportation resistance is low. As a result, there is a concern that cracking may occur in a contact portion between the positive electrode active material and the collector due to a volume change of the positive electrode active material, thereby reducing an effective carrier transportation resistance.

Known inorganic solid electrolytes include sulfide-based solid electrolytes and oxide-based solid electrolytes. The solid electrolytes are hard to be influenced by liquid leakage and the like and, therefore, are better than liquid electrolytes (electrolytic solutions) in the related art from the viewpoint of reliability and portability. On the other hand, the inorganic solid electrolytes have low flexibility compared with the electrolytic solutions in the related art and, therefore, are hard to form an interface to an active material involved in carrier transportation.

Regarding the electrode for a solid-state battery described in Japanese Patent Laid-Open No. 2009-146657 and 2, there is a concern that a volume change of the active material layer in accordance with repetition of charge and discharge is not limited to be completely relaxed in the interface side of the active material layer to the solid electrolyte layer having low flexibility. In addition, regarding the electrode for a solid-state battery described in Japanese Patent Laid-Open No. 2012-104270, since an active material layer contains predetermined voids in the collector layer side, there is a concern that a specific surface area related to the interface between the solid electrolyte and the electrode active material is restricted and carrier transfer is restricted.

SUMMARY OF INVENTION

It is an object of the present invention to provide an electrode which is applied to an all-solid-state battery and which includes a collector and an electrode active material that have carrier transportation capability suppressed from deteriorating due to a charge-discharge cycle. It is also an object of the present invention to provide an all-solid-state battery having high reliability.

In addition, it is an object of the present invention to provide an electrode for a solid-state battery, to which a solid electrolyte having low flexibility can be applied and which includes an active material layer containing a solid electrolyte and an active material that have carrier transportation capability suppressed from deteriorating due to a charge-discharge cycle. It is also an object of the present invention to provide a solid-state battery having high reliability.

An electrode according to an embodiment of the present invention is an electrode which is to be applied to a solid-state battery and including a collector layer and an active material layer disposed on the collector layer and showing a concentration distribution in a layer thickness direction which is, among directions parallel to a layer thickness, a direction toward the side in contact with the collector layer, wherein the active material layer contains at least any one of a conductive auxiliary agent showing a decreasing concentration gradient in the layer thickness direction and a solid electrolyte showing an increasing concentration gradient in the layer thickness direction.

An electrode according to an embodiment of the present invention is an electrode which is to be applied to a solid-state battery and including a collector layer and an active material layer disposed on the collector layer and including a solid electrolyte and an active material having a portion in contact with the collector layer, wherein the active material layer has a first region in which the active material shows a decreasing concentration gradient in the layer thickness direction, and the solid electrolyte shows an increasing concentration gradient in the first region in the layer thickness direction.

An electrode according to an embodiment of the present invention is an electrode which is to be applied to a solid-state battery and including a collector layer and an active material layer disposed on the collector layer including a conductive auxiliary agent and an active material having a portion in contact with the collector layer, wherein the active material layer has a second region in which the active material shows an increasing concentration gradient in the layer thickness direction, and the conductive auxiliary agent shows a decreasing concentration gradient in the second region in the layer thickness direction.

Further features of the present invention will become apparent from the following description of exemplary embodiments with reference to the attached drawings.

DESCRIPTION OF EMBODIMENTS

The preferred embodiments according to the present invention will be described below in detail with reference to the drawings. The dimensions, the materials, the shapes, the relative arrangements, and the like described in the embodiments are not intended to limit the scope of the present invention.

First Embodiment

Figure 1A:
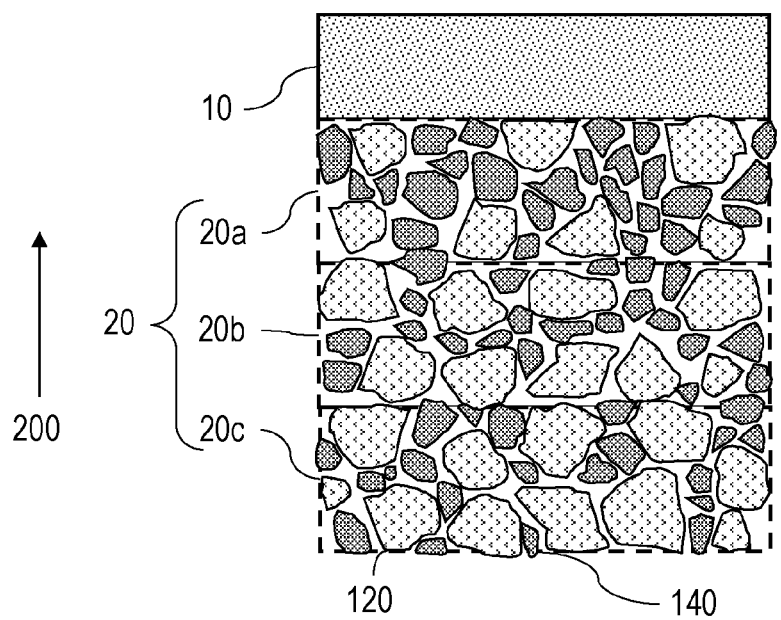
FIG. 1A is a diagram illustrating the stacking structure of a positive-electrode-side electrode according to a first embodiment of the present invention.
Figure 1B:
FIG. 1B is a diagram illustrating the volume fraction distribution of components contained in a positive electrode active material layer in the layer thickness direction according to the first embodiment of the present invention.
Figure 1B:
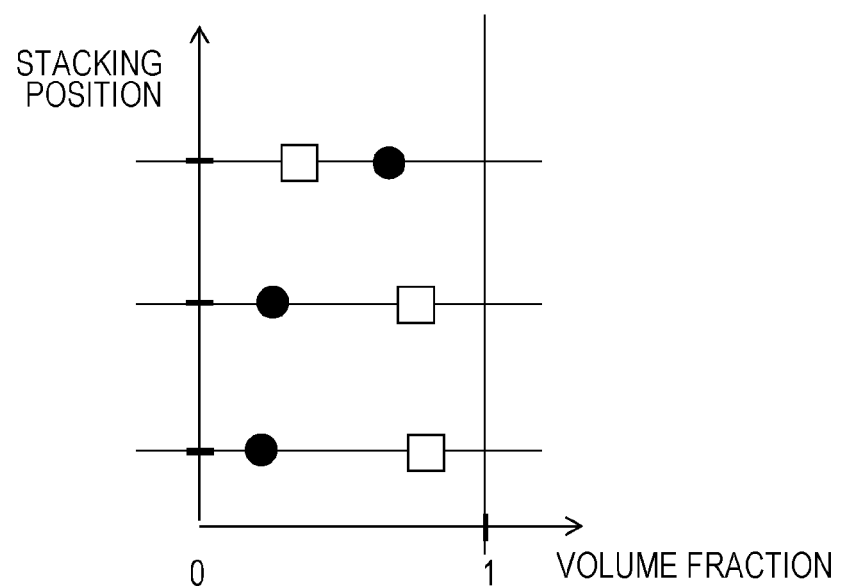
Figure 2:
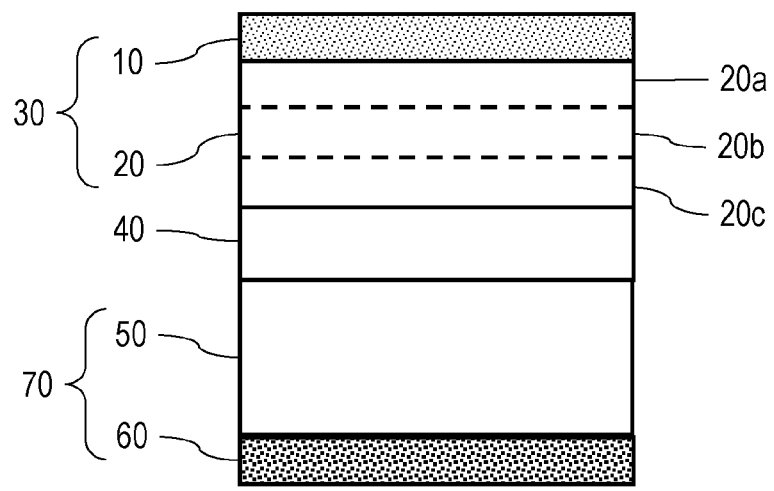
FIG. 2 is a diagram illustrating the stacking structure of an all-solid-state battery according to a second embodiment of the present invention.

A positive electrode including a positive electrode active material layer 20 will be described as an electrode according to a first embodiment. FIG. 1A is a configuration sectional view illustrating a positive electrode 30 according to the first embodiment of the present embodiment, and FIG. 1B is a graph illustrating the volume fraction distribution of components contained in the positive electrode active material layer 20 in the layer thickness direction 220.

As illustrated in FIG. 1A, the positive electrode 30 includes a collector layer 10 and the active material layer 20 containing a positive electrode active material 120 and a solid electrolyte 140. The active material layer 20 may also be referred to as a complex active material layer.

The collector layer 10 is a conductor that performs electron conduction between an external circuit not illustrated in the drawing and the active material layer. Regarding the collector layer 10, a self-supporting film, metal foil, or a stacked form with a resin base of a metal such as copper or aluminum is adopted.

The active material layer 20 includes an active material layers 20a, 20b, and 20c as sublayers which have the volume fractions of the positive electrode active material 120 and the solid electrolyte 140 different from each other.

As illustrated in FIG. 1B, regarding the active material layers 20a to 20c, the sublayer nearer the collector layer 10 has a volume fraction profile in which the volume fraction of the positive electrode active material 120 is lower and the volume fraction of the solid electrolyte 140 is higher in the stacking direction 200. That is, in other words, in the positive electrode 30 according to the present embodiment, the concentration gradients of the positive electrode active material and the solid electrolyte have slopes opposite to each other in the stacking direction 200.

The positive electrode active material 120 according to the present embodiment is LiCoO$_2$ (lithium cobalt oxide: hereafter also abbreviated as LCO), and the solid electrolyte 140 is Li$_3$BO$_3$ (lithium borate: hereafter also abbreviated as LBO). The positive electrode active material 120 (LCO) and the solid electrolyte 140 (LBO) according to the present embodiment have particle size distributions different from each other and average particle diameters different from each other, and the average particle diameter of LCO is about 2 to 3 times larger than that of LBO.

Regarding the collector layer side of the active material layer in the related art in which the positive electrode active material and the solid electrolyte have no volume fraction gradients in the layer thickness direction (the same as the stacking direction 200), giving and receiving of lithium ions are concentrated on the path from the solid electrolyte to the positive electrode active material. The reason for this is conjectured that the carrier transportation resistance of such a path from the solid electrolyte to the positive electrode active material is low. Consequently, in the complex positive electrode active material layer in the related art, regions in which a volume change of the positive electrode active material occurs are concentrated, thereby increasing the influence of cracking and the like thereof. The positive electrode 30 (electrode 30) according to the present embodiment is arranged so that the content of the positive electrode active material 120 in the collector layer 10 side of the active material layer 20 is restricted and so that the solid electrolyte 140 absorbs a volume change of the positive electrode active material 120.

In the present embodiment, it is conjectured that the solid electrolyte 140 has a smaller particle diameter than the positive electrode active material 120 and the density of contact points with respect to carrier transportation to the positive electrode active material 120 is largely ensured in the collector layer 10 side. In addition, it is conjectured that the solid electrolyte 140 has a smaller particle diameter than the positive electrode active material 120, forms secondary particles, and absorbs a volume change of the positive electrode active material 120 by deformation of secondary particles, thereby ensuring an effect of reducing stress. In other words, a volume change of the positive electrode active material 120 is absorbed by displacement of primary particles of the solid electrolyte 140, thereby ensuring an effect of reducing stress. Regarding each of the sublayers 20a, 20b, and 20c included in the positive electrode active material layer 20, the volume density distribution of each layer can be formed by controlling the area density of deposition in each layer by using a patterning method, such as a printing plate, electrophotography, an ink jet method, or a mask method.

In the present embodiment, the concentration gradient between the positive electrode active material layer 20a and the positive electrode active material layer 20b positioned in the side near the collector layer 10 is larger than the concentration gradient between the positive electrode active material layer 20b and the positive electrode active material layer 20c in the side far from the collector layer 10, thereby showing a nonlinear concentration gradient.

Examples of the positive electrode active material 120 include complex metal oxides containing lithium, chalcogen compounds, and manganese dioxide. The complex metal oxide containing lithium is a metal oxide containing lithium and a transition metal or a metal oxide in which a portion of the transition metal of the metal oxide is substituted with a different type of element. In this regard, examples of the different type of element include Na, Mg, Sc, Y, Mn, Fe, Co, Ni, Cu, Zn, Al, Cr, Pb, Sb, and B. The different type of element may be at least one type. Of these, complex metal oxides containing lithium are favorable. Examples of the complex metal oxide containing lithium include Li$_x$CoO$_2$, Li$_x$NiO$_2$, Li$_x$MnO$_2$, Li$_x$Co$_y$Ni$_{1-y}$O$_2$, Li$_x$Co$_y$Mn$_{1-y}$O$_z$, Li$_x$Ni$_{1-y}$M$_y$O$_z$, and Li$_x$Mn$_2$O$_4$. Examples of the complex metal oxide containing lithium further include Li$_x$Mn$_{2-y}$M$_y$O$_4$, LiMPO$_4$, and Li$_2$MPO$_4$F. In the formulae, M is at least one selected from the group consisting of Na, Mg, Sc, Y, Mn, Fe, Co, Ni, Cu, Zn, Al, Cr, Pb, Sb, V, and B. In the formulae, x, y, and z satisfy 0<x≤1.2, 0<y<0.9, and 2.0≤z≤2.3. Examples of the complex metal oxide containing lithium further include LiMeO$_2$ (in the formula, Me represents Me=M$_x$M$_y$M$_z$, Me and M are transition metals, and x+y+z=1 applies). Specific examples of the complex metal oxide containing lithium include LiCoO$_2$ (LCO: lithium cobalt oxide) and LiNi$_{0.5}$Mn$_{1.5}$O$_4$ (LNMO: lithium nickel manganese oxide). In addition, specific examples of the complex metal oxide containing lithium include LiFePO$_4$ (LFP: lithium iron phosphate) and Li$_3$V$_2$(PO$_4$)$_3$ (LVP: lithium vanadium phosphate). In this regard, the above-described positive electrode material may include a conductive auxiliary agent. Examples of the conductive auxiliary agent include graphite, such as natural graphite and artificial graphite, carbon black, such as acetylene black, Ketjenblack, channel black, furnace black, lamp black, and thermal black, and carbon fluoride powders. In addition, examples of the conductive auxiliary agent include conductive fiber, such as carbon fiber, carbon nanotube, and metal fiber, carbon fluoride, metal powders of aluminum and the like, conductive whisker of zinc oxide and the like, conductive metal oxides, such as titanium oxide, and organic conductive materials, such as phenylene derivatives.

Examples of the solid electrolyte 140 include oxide-based solid electrolytes, sulfide-based solid electrolytes, and complex-hydride-based solid electrolytes. Examples of the oxide-based solid electrolyte include NASICON-type compounds, such as aluminum-substituted lithium germanium phosphate Li$_{1.5}$Al$_{0.5}$Ge$_{1.5}$(PO$_4$)$_3$ and Li$_{1.3}$Al$_{0.3}$Ti$_{1.7}$(PO$_4$)$_3$. Examples of the oxide-based solid electrolyte include garnet-type compounds, such as Li$_{6.25}$La$_3$Zr$_2$Al$_{0.25}$O$_{12}$, and perovskite-type compounds, such as Li$_{0.33}$La$_{0.55}$TiO$_3$. In addition, examples of the oxide-based solid electrolyte include silicon-type compounds, such as Li$_{14}$Zn(GeO$_4$)$_4$ and acid compounds, such as Li$_3$PO$_4$, Li$_4$SiO$_4$, and Li$_3$BO$_3$. Specific examples of the sulfide-based solid electrolyte include Li$_2$S—SiS$_2$, LiI—Li$_2$S—SiS$_2$, LiI—Li$_2$S—P$_2$S$_5$, LiI—Li$_2$S—P$_2$O$_5$, LiI—Li$_3$PO$_4$—P$_2$S$_5$, and Li$_2$S—P$_2$S$_5$. Regarding the solid electrolyte, Li$_{6.75}$La$_3$Zr$_{1.75}$Nb$_{0.25}$O$_{12}$ (hereafter referred to as LLZ) is also adopted. In this regard, the solid electrolyte may be either crystalline or amorphous and may be glass ceramic. In this regard, the description such as Li$_2$S—P$_2$S$_5$ denotes a sulfide-based solid electrolyte produced by using raw materials containing Li$_2$S and P$_2$S$_5$. It is favorable that the solid electrolyte have lower Young's modulus than the positive electrode active material since a volume change of the positive electrode active material is absorbed. In other words, it is favorable that the solid electrolyte have lower modulus of elasticity than the positive electrode active material since a volume change of the positive electrode active material is absorbed.

Second Embodiment

The present embodiment is an embodiment in which a solid-state battery 100 is formed by using the positive electrode 30 according to the first embodiment. In other words, the positive electrode 30 according to the first embodiment is applied to a positive electrode of a solid-state battery 100. The solid-state battery 100 includes a solid electrolyte layer 40 on the surface opposite to the collector layer 10 side of the positive electrode active material layer 20. The solid-state battery 100 includes a negative electrode 70 disposed in contact with the solid electrolyte layer 40 on the side opposite to the side where the solid electrolyte layer 40 contacts the positive electrode active material layer 20. The negative electrode 70 includes a negative electrode active material layer 50 disposed in contact with the solid electrolyte layer 40 on the side opposite to the side where the solid electrolyte layer 40 contacts the positive electrode active material layer 20. The negative electrode 70 includes a negative electrode collector layer 60 disposed in contact with the negative electrode active material layer 50 on the side opposite to the side where the negative electrode active material layer 50 contacts the solid electrolyte layer 40.

Regarding the solid electrolyte layer 40, as in the instance of the solid electrolyte 140 contained in the above-described positive electrode active material layer 20, oxide-based solid electrolytes, sulfide-based solid electrolytes, and complex-hydride-based solid electrolytes are adopted as inorganic electrolyte materials. The composition of the solid electrolyte included in the solid electrolyte layer 40 may be the same as or may differ from the composition of the solid electrolyte 140 contained in the positive electrode active material layer 20.

When the composition differs from the composition of the solid electrolyte 140 contained in the positive electrode active material layer 20, a sulfide-based solid electrolyte having high flexibility may be adopted for the positive electrode active material layer 20, and an oxide-based solid electrolyte having excellent thermal stability may be adopted for the solid electrolyte layer 40.

The negative electrode active material layer 50 can contain, for example, graphite or In as a negative electrode active material. The negative electrode collector layer 60 can be formed from metal foil or a metal film as in the instance of the positive electrode collector layer 10.

The solid-state battery 100 according to the present embodiment has high reliability since cracking due to a volume change of the positive electrode active material 120 is reduced in the collector layer 10 side of the positive electrode active material layer 20 included in the positive electrode 30, thereby increasing an operation life.

Third Embodiment

Figure 3A:
FIG. 3A is a diagram illustrating the volume fraction distribution of components contained in a positive electrode active material layer in the layer thickness direction according to a third embodiment of the present invention.
Figure 3A:
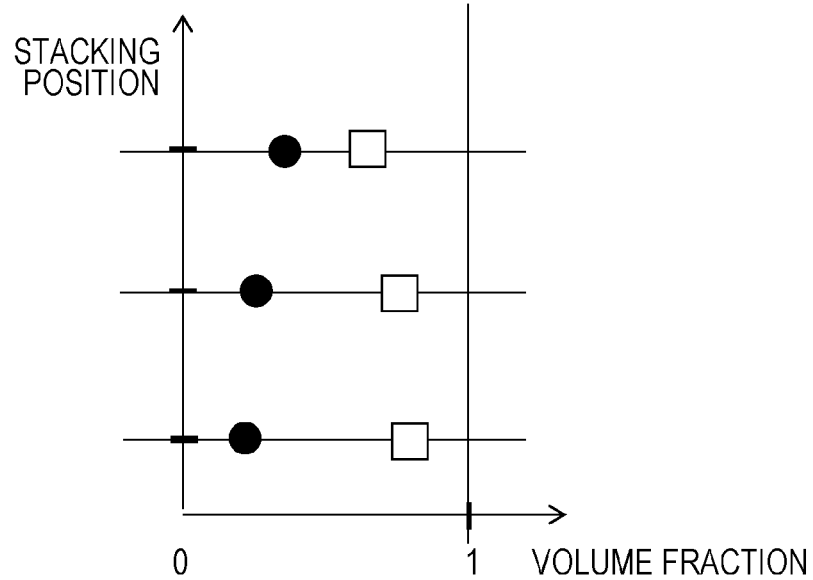

The positive electrode 30 according to the present embodiment differs from the positive electrode 30 according to the first embodiment, and the volume fraction distribution in the stacking direction 200 of the positive electrode active material 120 and the solid electrolyte 140 contained in the positive electrode active material layer 20 is as illustrated in FIG. 3A. The positive electrode active material layer 20 according to the present embodiment is the same as that in the positive electrode 30 according to the first embodiment except that the volume fraction of the positive electrode active material 120 (LCO) is lower than the volume fraction of the solid electrolyte 140 (LBO) even in the positive electrode active material layer 20a nearest the collector layer 10. Regarding the solid-state battery by using the positive electrode 30 according to the present embodiment, as in the first embodiment, the influence of cracking and the like due to a volume change of the positive electrode active material 120 can be reduced.

Fourth Embodiment

Figure 3B:
FIG. 3B is a diagram illustrating the volume fraction distribution of components contained in a positive electrode active material layer in the layer thickness direction according to a fourth embodiment of the present invention.
Figure 3B:
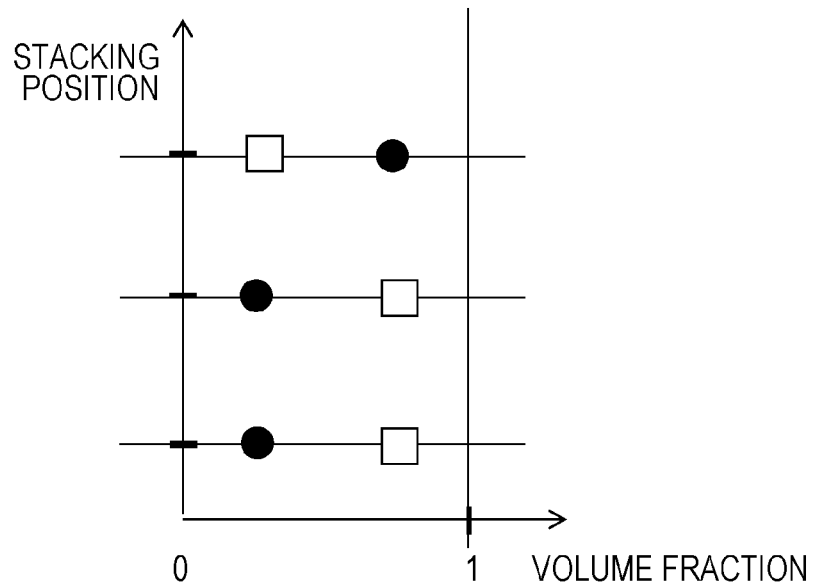

The positive electrode 30 according to the present embodiment differs from the positive electrode 30 according to the first embodiment, and the volume fraction distribution in the stacking direction 200 of the positive electrode active material 120 and the solid electrolyte 140 contained in the positive electrode active material layer 20 is as illustrated in FIG. 3B. The positive electrode active material layer 20 according to the present embodiment is the same as that in the positive electrode 30 according to the first embodiment except that the volume fractions of the positive electrode active material 120 (LCO) of two layers, the positive electrode active material layers 20b and 20c, in the side far from the collector layer 10 are equal and that the volume fractions of the solid electrolyte 140 (LBO) are also equal.

Regarding the solid-state battery by using the positive electrode 30 according to the present embodiment, as in the first embodiment, the influence of cracking and the like due to a volume change of the positive electrode active material 120 can be reduced.

Fifth Embodiment

Figure 3C:
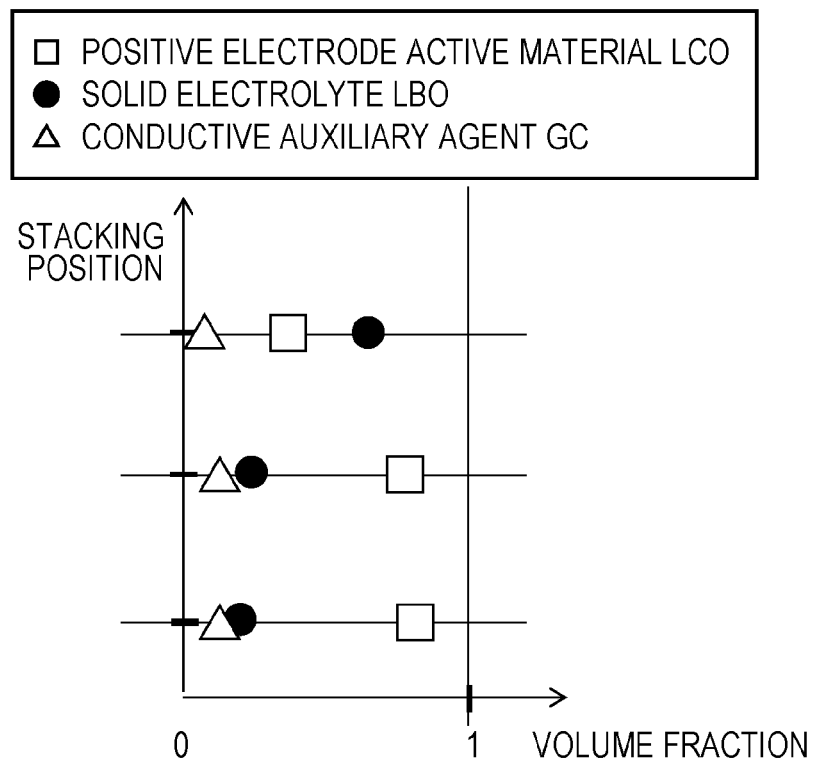
FIG. 3C is a diagram illustrating the volume fraction distribution of components contained in a positive electrode active material layer in the layer thickness direction according to a fifth embodiment of the present invention.

The positive electrode 30 according to the present embodiment differs from the positive electrode 30 according to the first embodiment, and the volume fraction distribution in the stacking direction 200 of the positive electrode active material 120 and the solid electrolyte 140 contained in the positive electrode active material layer 20 is as illustrated in FIG. 3C. In the positive electrode active material layer 20 according to the present embodiment, each of the layers 20a to 20c contains graphite (carbon black) as a conductive auxiliary agent, and the volume fraction of the graphite is decreased with increasing proximity to the collector layer 10. That is, the positive electrode active material layer 20 according to the present embodiment is the same as that in the positive electrode 30 according to the first embodiment except that a region showing a concentration gradient in which the conductive auxiliary agent is reduced with increasing proximity to the collector layer 10 in the layer thickness direction 200 is included.

Regarding the solid-state battery by using the positive electrode 30 according to the present embodiment, as in the first embodiment, the influence of cracking and the like due to a volume change of the positive electrode active material 120 can be reduced.

Sixth Embodiment

Figure 4A:
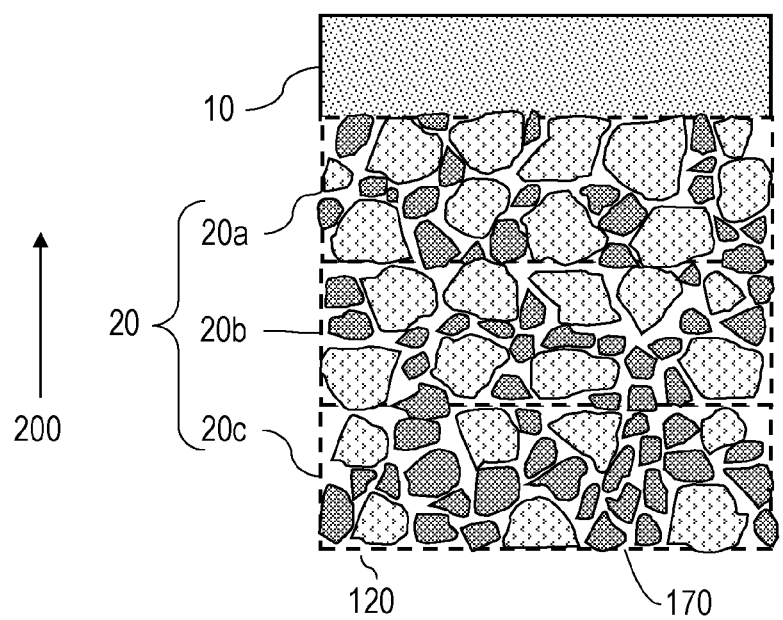
FIG. 4A is a diagram illustrating the stacking structure of a positive-electrode-side electrode according to a sixth embodiment of the present invention.
Figure 4B:
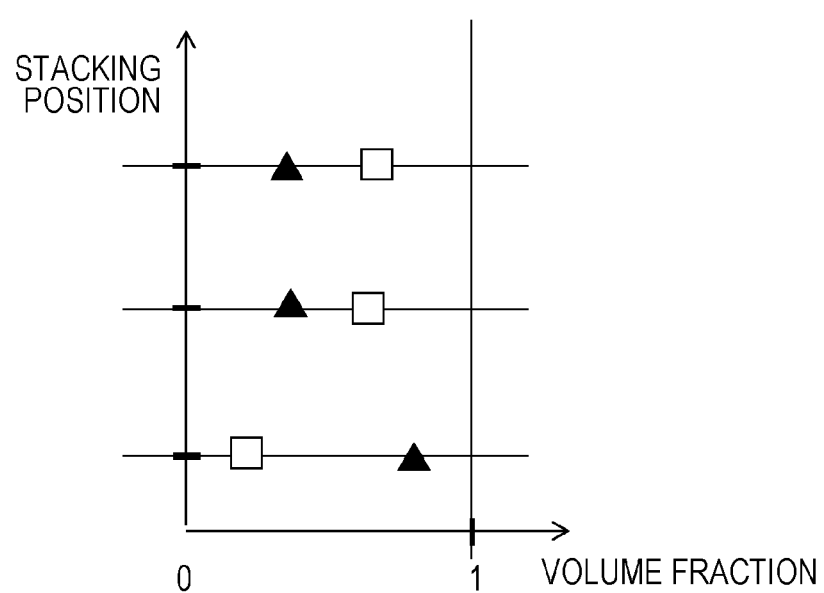
FIG. 4B is a diagram illustrating the volume fraction distribution of components contained in a positive electrode active material layer in the layer thickness direction according to the sixth embodiment of the present invention.
Figure 5:
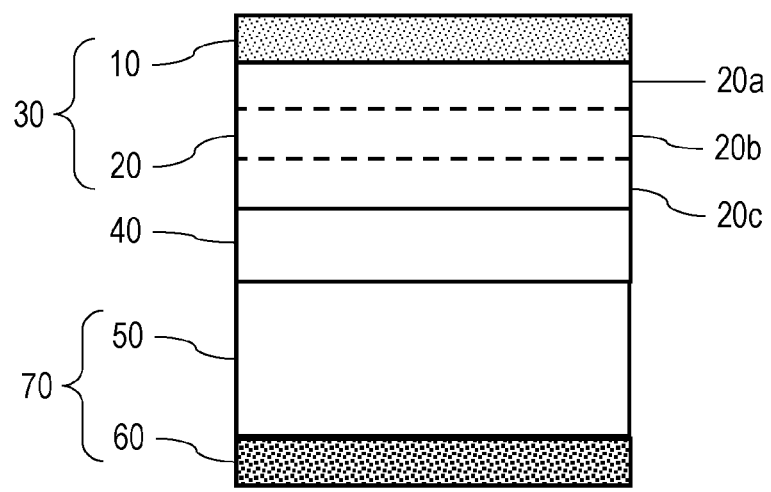
FIG. 5 is a diagram illustrating the stacking structure of an all-solid-state battery according to a seventh embodiment of the present invention.

To begin with, a positive electrode including the positive electrode active material layer 20 will be described as an electrode according to a sixth embodiment. FIG. 4A is a configuration sectional view illustrating a positive electrode 30 according to the present embodiment, and FIG. 4B is a graph illustrating the volume fraction distribution of components contained in the positive electrode active material layer 20 in the layer thickness direction 220.

As illustrated in FIG. 4A, the positive electrode 30 includes a collector layer 10 and the active material layer 20 containing a positive electrode active material 120 and a conductive auxiliary agent 170. The active material layer 20 may also be referred to as a complex active material layer.

The collector layer 10 is a conductor that performs electron conduction between an external circuit not illustrated in the drawing and the active material layer. Regarding the collector layer 10, a self-supporting film, metal foil, or a stacked form with a resin base of a metal such as copper or aluminum is adopted.

The active material layer 20 includes an active material layers 20a, 20b, and 20c as sublayers which have the volume fractions of the positive electrode active material 120 and the conductive auxiliary agent 170 different from each other.

As illustrated in FIG. 4B, regarding the active material layers 20a to 20c, the sublayer nearer the collector layer 10 shows a volume fraction profile in which the volume fraction of the positive electrode active material 120 is higher and the volume fraction of the conductive auxiliary agent 170 is lower in the stacking direction 200. That is, in other words, in the positive electrode 30 according to the present embodiment, the concentration gradients of the positive electrode active material 120 and the conductive auxiliary agent 170 have slopes opposite to each other in the stacking direction 200. The active material layer 20 has a region showing a concentration gradient in which the positive electrode active material 120 is increased in the layer thickness direction 200 toward the collector layer 10. On the other hand, in other words, the conductive auxiliary agent 170 shows a concentration gradient which is decreased in the layer thickness direction 200 in the above-described region.

The positive electrode active material 120 according to the present embodiment is LiCoO$_2$ (lithium cobalt oxide: hereafter also abbreviated as LCO), and the conductive auxiliary agent 170 is conductive auxiliary agent 170 (GC). The positive electrode active material 120 (LCO) and the conductive auxiliary agent 170 (GC) according to the present embodiment have particle size distributions different from each other and average particle diameters different from each other, and the average particle diameter of LCO is about 2 to 3 times larger than that of LBO.

The content of the positive electrode active material 120 in the solid electrolyte layer 40 side of the active material layer 20 is relatively lower than the collector layer 10 side, transfer of lithium ions between the positive electrode active material 120 and the solid electrolyte 140 in the solid electrolyte layer 40 is localized, and the influence of a volume change of the positive electrode active material 120 increases. In the positive electrode 30 (electrode 30) according to the present embodiment, the conductive auxiliary agent 170 is arranged so as to absorb a volume change of the positive electrode active material 120 in the solid electrolyte layer 40 side of the active material layer 20.

Known inorganic solid electrolytes include sulfide-based solid electrolytes and oxide-based solid electrolytes.

The sulfide-based solid electrolyte has about an order of magnitude higher lithium ion conductivity than the oxide-based solid electrolyte and is a solid having excellent plasticity, so that bonding of the interface between the electrode and the solid electrolyte can be readily performed. However, since there is a concern that the sulfide-based solid electrolyte may generate hydrogen sulfide gas having toxicity when being exposed to air, there are problems of an increase in production cost such as necessity for a sealing structure in mounting and a reduction in an effective mounting density.

On the other hand, oxide-based solid electrolyte may forgo a sealing structure due to chemical stability but has lower flexibility than the sulfide-based solid electrolyte. Consequently, an influence of a volume change of the active material contained in the above-described active material layer in accordance with charge and discharge is hard to be relaxed.

The positive electrode 30 according to the present embodiment contains the conductive auxiliary agent 170 as a buffering agent for relaxing the influence of a volume change in the solid electrolyte layer 40 side of the active material layer 20 and, therefore, is also suitable for the solid-state battery including an electrolyte layer containing such a solid electrolyte having low flexibility.

In the present embodiment, it is conjectured that the conductive auxiliary agent 170 has a smaller diameter than the positive electrode active material 120, thereby largely ensuring the density of contact points with respect to carrier transportation to the positive electrode active material 120 in the collector layer 10 side. In addition, it is conjectured that the conductive auxiliary agent 170 has a smaller particle diameter than the positive electrode active material 120, forms secondary particles, and absorbs a volume change of the positive electrode active material 120 by deformation of secondary particles, thereby ensuring an effect of reducing stress. In other words, a volume change of the positive electrode active material 120 is absorbed by displacement of primary particles of conductive auxiliary agent 170, thereby ensuring an effect of reducing stress.

Regarding each of the sublayers 20a, 20b, and 20c included in the positive electrode active material layer 20, the volume density distribution of each layer can be formed by controlling the area density of deposition in each layer by using a patterning method, such as a printing plate, electrophotography, an ink jet method, or a mask method.

In the present embodiment, the concentration gradient between the positive electrode active material layer 20c and the positive electrode active material layer 20b positioned in the side far from the collector layer 10 is larger than the concentration gradient between the positive electrode active material layer 20b and the positive electrode active material layer 20a in the side near the collector layer 10, thereby showing a nonlinear concentration gradient.

Examples of the positive electrode active material 120 include complex metal oxides containing lithium, chalcogen compounds, and manganese dioxide. The complex metal oxide containing lithium is a metal oxide containing lithium and a transition metal or a metal oxide in which a portion of the transition metal of the metal oxide is substituted with a different type of element. In this regard, examples of the different type of element include Na, Mg, Sc, Y, Mn, Fe, Co, Ni, Cu, Zn, Al, Cr, Pb, Sb, and B. The different type of element may be at least one type. Of these, complex metal oxides containing lithium are favorable. Examples of the complex metal oxide containing lithium include $Li_xCoO_2$, $Li_xNiO_2$, $Li_xMnO_2$, $Li_xCo_yNi_{1-y}O_2$, $Li_xCo_yMn_{1-y}O_2$, $Li_xNi_{1-y}M_yO_2$, and $Li_xMn_2O_4$. Examples of the complex metal oxide containing lithium further include $Li_xMn_{2-y}M_yO_4$, $LiMPO_4$, and $Li_2MPO_4F$. In the formulae, M is at least one selected from the group consisting of Na, Mg, Sc, Y, Mn, Fe, Co, Ni, Cu, Zn, Al, Cr, Pb, Sb, V, and B. In the formulae, x, y, and z satisfy $0<x\le1.2$, $0<y<0.9$, and $2.0\le z\le 2.3$. Examples of the complex metal oxide containing lithium further include $LiMeO_2$ (in the formula, Me represents $Me=M_xM_yM_z$, Me and M are transition metals, and $x+y+z=1$ applies). Specific examples of the complex metal oxide containing lithium include $LiCoO_2$ (LCO: lithium cobalt oxide) and $LiNi_{0.5}Mn_{1.5}O_4$ (LNMO: lithium nickel manganese oxide). In addition, specific examples of the complex metal oxide containing lithium include $LiFePO_4$ (LFP: lithium iron phosphate) and $Li_3V_2(PO_4)_3$ (LVP: lithium vanadium phosphate). In this regard, the above-described positive electrode material may include a conductive auxiliary agent. Examples of the conductive auxiliary agent include graphite, such as natural graphite and artificial graphite, carbon black, such as acetylene black, Ketjenblack, channel black, furnace black, lamp black, and thermal black, and carbon fluoride powders. In addition, examples of the conductive auxiliary agent include conductive fiber, such as carbon fiber, carbon nanotube, and metal fiber, carbon fluoride, metal powders of aluminum and the like, conductive whisker of zinc oxide and the like, conductive metal oxides, such as titanium oxide, and organic conductive materials, such as phenylene derivatives.

It is favorable that the conductive auxiliary agent 170 have lower Young's modulus than the positive electrode active material 120 since a volume change of the positive electrode active material is absorbed. In other words, it is favorable that the conductive auxiliary agent 170 have lower modulus of elasticity than the positive electrode active material 120 since a volume change of the positive electrode active material is absorbed.

Seventh Embodiment

The present embodiment is an embodiment in which a solid-state battery 100 is formed by using the positive electrode 30 according to the sixth embodiment. In other words, the positive electrode 30 according to the sixth embodiment is applied to a positive electrode of a solid-state battery 100. The solid-state battery 100 includes a solid electrolyte layer 40 on the surface opposite to the collector layer 10 side of the positive electrode active material layer 20. The solid-state battery 100 includes a negative electrode 70 disposed in contact with the solid electrolyte layer 40 on the side opposite to the side where the solid electrolyte layer 40 contacts the positive electrode active material layer 20 (20c). The negative electrode 70 includes a negative electrode active material layer 50 disposed in contact with the solid electrolyte layer 40 on the side opposite to the side where the solid electrolyte layer 40 contacts the positive electrode active material layer 20 (20c). The negative electrode 70 includes a negative electrode collector layer 60 disposed in contact with the negative electrode active material layer 50 on the side opposite to the side where the negative electrode active material layer 50 contacts the solid electrolyte layer 40.

The solid electrolyte layer 40 contains an inorganic solid electrolyte. Examples of the solid electrolyte include oxide-based solid electrolytes, sulfide-based solid electrolytes, and complex-hydride-based solid electrolytes. Examples of the oxide-based solid electrolyte include NASICON-type compounds, such as aluminum-substituted lithium germanium phosphate $Li_{1.5}Al_{0.5}Ge_{1.5}(PO_4)_3$ and $Li_{1.3}Al_{0.3}Ti_{1.7}(PO_4)_3$. Examples of the oxide-based solid electrolyte include garnet-type compounds, such as $Li_{6.25}La_3Zr_2Al_{0.25}O_{12}$, and perovskite-type compounds, such as $Li_{0.33}La_{0.55}TiO_3$. In addition, examples of the oxide-based solid electrolyte include silicon-type compounds, such as $Li_{14}Zn(GeO_4)_4$ and acid compounds, such as $Li_3PO_4$, $Li_4SiO_4$, and $Li_3BO_3$. Specific examples of the sulfide-based solid electrolyte include $Li_2S$—$SiS_2$, LiI—$Li_2S$—$SiS_2$, LiI—$Li_2S$—$P_2S_5$, LiI—$Li_2S$—$P_2O_5$, LiI—$Li_3PO_4$—$P_2S_5$, and $Li_2S$—$P_2S_5$. Regarding the solid electrolyte, $Li_{6.75}La_3Zr_{1.75}Nb_{0.25}O_{12}$ (hereafter referred to as LLZ) is also adopted. In this regard, the solid electrolyte may be either crystalline or amorphous and may be glass ceramic. In this regard, the description such as $Li_2S$—$P_2S_5$ denotes a sulfide-based solid electrolyte produced by using raw materials containing $Li_2S$ and $P_2S_5$.

The positive electrode active material layer 20 may contain a solid electrolyte, and the composition may be the same as or may differ from the solid electrolyte contained in the solid electrolyte layer 40. It is favorable that the positive electrode active material layer 20 have lower Young's modulus (modulus of elasticity) than the solid electrolyte contained in the solid electrolyte layer 40 when the positive electrode active material layer 20 contains the solid electrolyte.

The negative electrode active material layer 50 can contain, for example, graphite or In as a negative electrode active material. The negative electrode collector layer 60 can be formed from metal foil or a metal film as in the instance of the positive electrode collector layer 10.

The solid-state battery 100 according to the present embodiment has high reliability since cracking due to a volume change of the positive electrode active material 120 is reduced in the collector layer 10 side of the positive electrode active material layer 20 included in the positive electrode 30, thereby increasing an operation life.

Eighth Embodiment

Figure 6A:
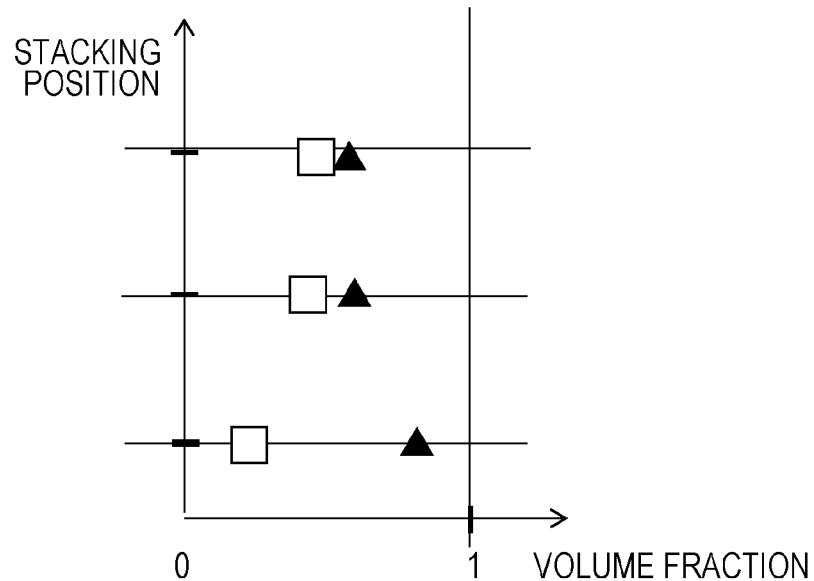
FIG. 6A is a diagram illustrating the volume fraction distribution of components contained in a positive electrode active material layer in the layer thickness direction according to an eighth embodiment of the present invention.

The positive electrode 30 according to the present embodiment differs from the positive electrode 30 according to the first embodiment, and the volume fraction distribution in the stacking direction 200 of the positive electrode active material 120 and the conductive auxiliary agent 170 contained in the positive electrode active material layer 20 is as illustrated in FIG. 6A. The positive electrode active material layer 20 according to the present embodiment is the same as that in the positive electrode 30 according to the first embodiment except that the volume fraction of the positive electrode active material 120 (LCO) is lower than the volume fraction of the conductive auxiliary agent 170 (GC) even in the positive electrode active material layer 20a nearest the collector layer 10. Regarding the solid-state battery by using the positive electrode 30 according to the present embodiment, as in the first embodiment, the influence of cracking and the like due to a volume change of the positive electrode active material 120 can be reduced.

Ninth Embodiment

Figure 6B:
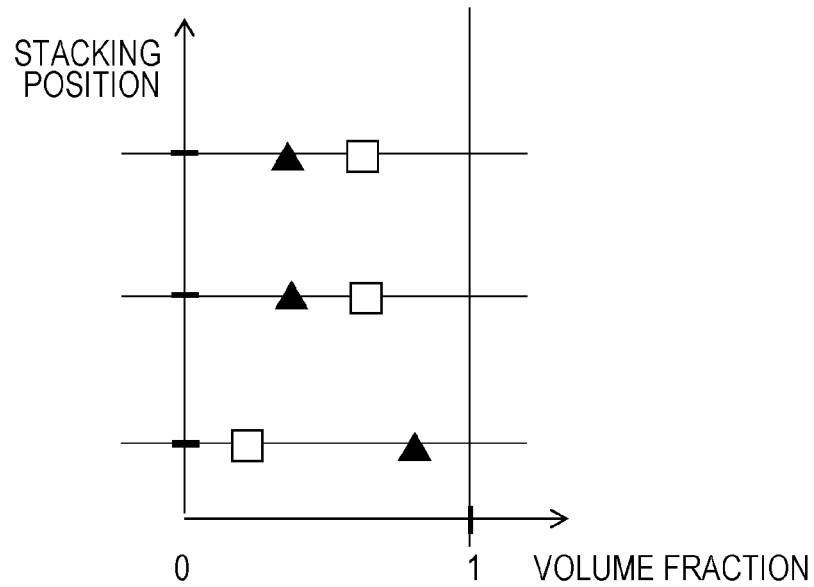
FIG. 6B is a diagram illustrating the volume fraction distribution of components contained in a positive electrode active material layer in the layer thickness direction according to a ninth embodiment of the present invention.

The positive electrode 30 according to the present embodiment differs from the positive electrode 30 according to the first embodiment, and the volume fraction distribution in the stacking direction 200 of the positive electrode active material 120 and the conductive auxiliary agent 170 contained in the positive electrode active material layer 20 is as illustrated in FIG. 6B. The positive electrode active material layer 20 according to the present embodiment is the same as that in the positive electrode 30 according to the first embodiment except that the volume fractions of the positive electrode active material 120 (LCO) of two layers, the positive electrode active material layers 20a and 20b, in the side near the collector layer 10 are equal and that the volume fractions of the conductive auxiliary agent 170 (GC) are also equal.

Regarding the solid-state battery by using the positive electrode 30 according to the present embodiment, as in the first embodiment, the influence of cracking and the like due to a volume change of the positive electrode active material 120 can be reduced.

Tenth Embodiment

Figure 6C:
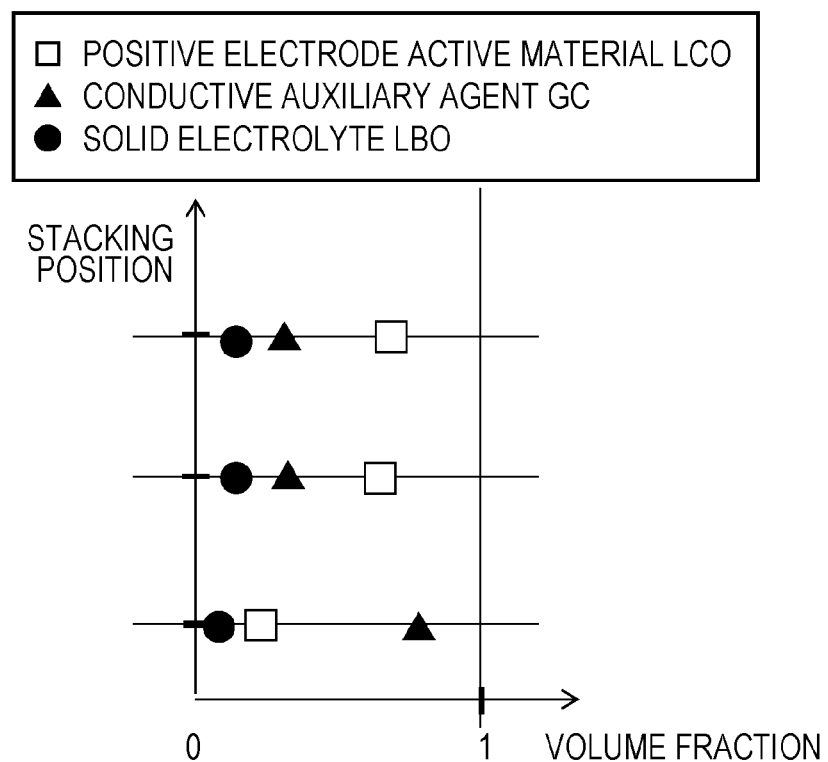
FIG. 6C is a diagram illustrating the volume fraction distribution of components contained in a positive electrode active material layer in the layer thickness direction according to a tenth embodiment of the present invention.

The positive electrode 30 according to the present embodiment differs from the positive electrode 30 according to the first embodiment, and the volume fraction distribution in the stacking direction 200 of the positive electrode active material 120 and the conductive auxiliary agent 170 contained in the positive electrode active material layer 20 is as illustrated in FIG. 6C. In the positive electrode active material layer 20 according to the present embodiment, each of the layers 20a to 20c contains lithium borate (LBO) as a solid electrolyte, and the volume fraction of the solid electrolyte (LBO) is decreased with increasing proximity to the collector layer 10. That is, the positive electrode active material layer 20 according to the present embodiment is the same as that in the positive electrode 30 according to the first embodiment except that a region showing a concentration gradient in which the solid electrolyte is reduced with increasing proximity to the solid electrolyte layer in the layer thickness direction 200 is included.

Regarding the solid-state battery by using the positive electrode 30 according to the present embodiment, as in the first embodiment, the influence of cracking and the like due to a volume change of the positive electrode active material 120 can be reduced.

According to the present invention, it is possible to provide an electrode which is applied to an all-solid-state battery and which includes a collector and an electrode active material that have carrier transportation capability suppressed from deteriorating due to a charge-discharge cycle. In addition, the present invention can provide an all-solid-state battery having high reliability.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An anode which is to be applied to a solid-state battery, the anode comprising:
   a collector layer; and
   an anode active material layer disposed on the collector layer and including an anode active material showing a decreasing concentration gradient in a first region in a layer thickness direction which is, among the directions parallel to the layer thickness, a direction toward the side in contact with the collector layer,
   wherein the anode active material layer includes a conductive auxiliary agent showing a decreasing concentration gradient in the first region in the layer thickness direction and a solid electrolyte showing an increasing concentration gradient in the first region in the layer thickness direction.

2. The anode according to claim 1, wherein the solid electrolyte has a lower Young's modulus than the anode active material.

3. The anode according to claim 1, wherein the solid electrolyte is an inorganic substance containing an oxide or a sulfide.

4. The anode according to claim 1, wherein the solid electrolyte contains lithium.

5. The anode according to claim 4, wherein the solid electrolyte contains at least one of lithium borate, aluminum-substituted lithium germanium phosphate, and LLZ.

6. The anode according to claim 1, wherein the active material is an anode active material containing lithium or a cathode active material containing lithium.

7. The anode according to claim 6, wherein the anode active material contains lithium cobalt oxide.

8. The anode according to claim 1, wherein the conductive auxiliary agent contains carbon black, carbon fiber, carbon nanotube, a carbon fluoride powder, a metal powder, or metal fiber.

9. A solid-state battery comprising:
   the anode according to claim 1; and
   a solid electrolyte layer disposed in contact with the anode active material layer on the side opposite to the side where the anode active material layer contacts the collector layer.

10. The solid-state battery according to claim 9, wherein the solid electrolyte contained in the solid electrolyte layer has a composition different from the composition of the solid electrolyte contained in the anode active material layer.

11. The solid-state battery according to claim 9, wherein the solid electrolyte layer contains no anode active material.

12. An anode which is to be applied to a solid-state battery, the anode comprising:
   a collector layer; and
   an anode active material layer disposed on the collector layer and including an anode active material showing an increasing concentration gradient in a second region in a layer thickness direction which is, among the directions parallel to the layer thickness, a direction toward the side in contact with the collector layer,
   wherein the anode active material layer includes a conductive auxiliary agent showing a decreasing concentration gradient in the second region in the layer thickness direction and a solid electrolyte showing an increasing concentration gradient in the second region in the layer thickness direction.

13. The anode according to claim 12, wherein the solid electrolyte is an inorganic substance containing an oxide or a sulfide.

14. The anode according to claim 12, wherein the solid electrolyte contains lithium.

15. The anode according to claim 14, wherein the solid electrolyte contains at least one of lithium borate, aluminum-substituted lithium germanium phosphate, and LLZ.

16. The anode according to claim 12, wherein the active material is an anode active material containing lithium or a cathode active material containing lithium.

17. The anode according to claim 16, wherein the anode active material contains lithium cobalt oxide.

18. The anode according to claim 12, wherein the conductive auxiliary agent contains carbon black, carbon fiber, carbon nanotube, a carbon fluoride powder, a metal powder, or metal fiber.

19. A solid-state battery comprising:
   the anode according to claim 12; and
   a solid electrolyte layer disposed in contact with the anode active material layer on the side opposite to the side where the anode active material layer contacts the collector layer.

20. The solid-state battery according to claim 19, wherein the solid electrolyte contained in the solid electrolyte layer has a composition different from the composition of the solid electrolyte contained in the anode active material layer.

21. The solid-state battery according to claim 19, wherein the solid electrolyte layer contains no anode active material.

22. The anode according to claim 12, wherein the conductive auxiliary agent has a lower Young's modulus than the anode active material.

\* \* \* \* \*